United States Patent
Noguchi et al.

(10) Patent No.: US 7,925,262 B2
(45) Date of Patent: Apr. 12, 2011

(54) SYSTEM AND ASSOCIATED METHOD OF MAINTAINING PACKET SWITCHING CAPABILITY IN A CELLULAR NETWORK

(75) Inventors: Katsuhiro Noguchi, Yokohama (JP); Kazuyuki Kozu, Yokosuka (JP); Kota Fujimura, Yokosuka (JP); Takashi Suzuki, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 536 days.

(21) Appl. No.: 11/094,185

(22) Filed: Mar. 31, 2005

(65) Prior Publication Data

US 2005/0233745 A1    Oct. 20, 2005

(30) Foreign Application Priority Data

Mar. 31, 2004    (JP) ................................. 2004-108113

(51) Int. Cl.
*H04W 4/00*    (2009.01)
*H04W 72/00*    (2009.01)

(52) U.S. Cl. ....................... 455/435.1; 455/433; 455/453

(58) Field of Classification Search ............... 455/435.1, 455/561, 418, 433, 434, 453; 370/352
See application file for complete search history.

(56) References Cited

U.S. PATENT DOCUMENTS

| | | | | |
|---|---|---|---|---|
| 5,090,011 | A * | 2/1992 | Fukuta et al. ................. | 370/230 |
| 5,862,480 | A * | 1/1999 | Wild et al. ................. | 455/432.2 |
| 6,233,447 | B1 * | 5/2001 | Tomoike ....................... | 455/411 |
| 7,130,271 | B1 * | 10/2006 | Sekihata ....................... | 370/236 |
| 7,333,437 | B1 * | 2/2008 | Glick ........................... | 370/236 |
| 2001/0005359 | A1 * | 6/2001 | Bergqvist ...................... | 370/230 |
| 2001/0040872 | A1 * | 11/2001 | Haglund ........................ | 370/235 |
| 2002/0009995 | A1 * | 1/2002 | Fujii ............................. | 455/435 |
| 2003/0129973 | A1 * | 7/2003 | Oishi et al. .................... | 455/414 |
| 2003/0157923 | A1 * | 8/2003 | Tani .............................. | 455/404 |
| 2003/0224719 | A1 * | 12/2003 | Lucidarme et al. ............ | 455/1 |
| 2004/0017798 | A1 * | 1/2004 | Hurtta et al. ................. | 370/352 |
| 2004/0072578 | A1 * | 4/2004 | Keutmann et al. ......... | 455/456.1 |

(Continued)

FOREIGN PATENT DOCUMENTS

GB    2 381 164 A    4/2003

(Continued)

OTHER PUBLICATIONS

"3GPP TS 23.236 V6.0.0", $3^{RD}$ Generation Partnership Project; Technical Specification Group Services and System Aspects; Intra-domain connection of Radio Access Network (RAN) nodes to multiple Core Network (CN) nodes (Release 6), Dec. 2004, pp. 1-35.

(Continued)

*Primary Examiner* — George Eng
*Assistant Examiner* — Christopher M Brandt
(74) *Attorney, Agent, or Firm* — Oblon, Spivak, McClelland, Maier & Neustadt, L.L.P.

(57) ABSTRACT

A mobile station performs location registration to one of exchanges managing a location registration area where the mobile station is located, in a mobile communication system in which a plurality of exchanges manage one location registration area and a radio network controller is connected to the plurality of exchanges. The mobile station includes a communication controller configured to stop transmission of signals to the radio network controller, when an identifier of an exchange notified by an access restriction signal from the radio network controller matches an identifier of an exchange which has performed the location registration of the mobile station.

9 Claims, 7 Drawing Sheets

U.S. PATENT DOCUMENTS

2004/0249915 A1* 12/2004 Russell .................. 709/223
2005/0048984 A1* 3/2005 Foster et al. .................. 455/453

FOREIGN PATENT DOCUMENTS

| | | |
|---|---|---|
| JP | 5-219556 | 8/1993 |
| JP | 7-264662 | 10/1995 |
| JP | 2000-197088 | 7/2000 |
| JP | 2002-135842 | 5/2002 |
| WO | WO 00/18171 | 3/2000 |
| WO | WO 00/31995 | 6/2000 |
| WO | WO 01/91370 A2 | 11/2001 |
| WO | WO 02/065800 A1 | 8/2002 |
| WO | WO 03/100647 A1 | 12/2003 |

OTHER PUBLICATIONS

3GPP TS 25.331 V6.2.0., $3^{RD}$ Generation Partnership Project, Jun. 2004, pp. 1-1036.

\* cited by examiner

SYSTEM AND ASSOCIATED METHOD OF MAINTAINING PACKET SWITCHING CAPABILITY IN A CELLULAR NETWORK

CROSS REFERENCE TO RELATED APPLICATION

This application is based upon and claims the benefit of priority from the prior Japanese Patent Application No. P2004-108113, filed on Mar. 31, 2004; the entire contents of which are incorporated herein by reference.

BACKGROUND OF THE INVENTION

1. Field of the Invention

The present invention relates to a mobile communication method in which a mobile station performs location registration to one of exchanges managing a location registration area where the mobile station is located, in a mobile communication system where a plurality of exchanges manage one location registration area and a radio network controller is connected to the plurality of exchanges.

The present invention also relates to a mobile station and a radio network controller which can be used in the mobile communication method.

2. Description of the Related Art

Figure 1A:
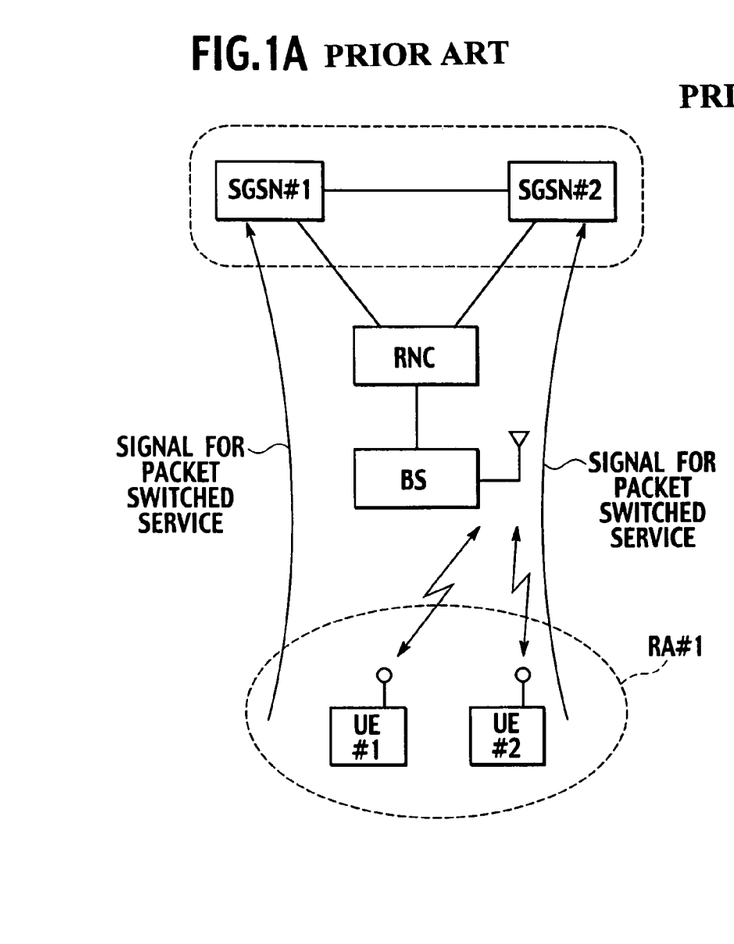
FIGS. 1A and 1B are views of an entire configuration and an operation of a conventional mobile communication system.
Figure 1B:
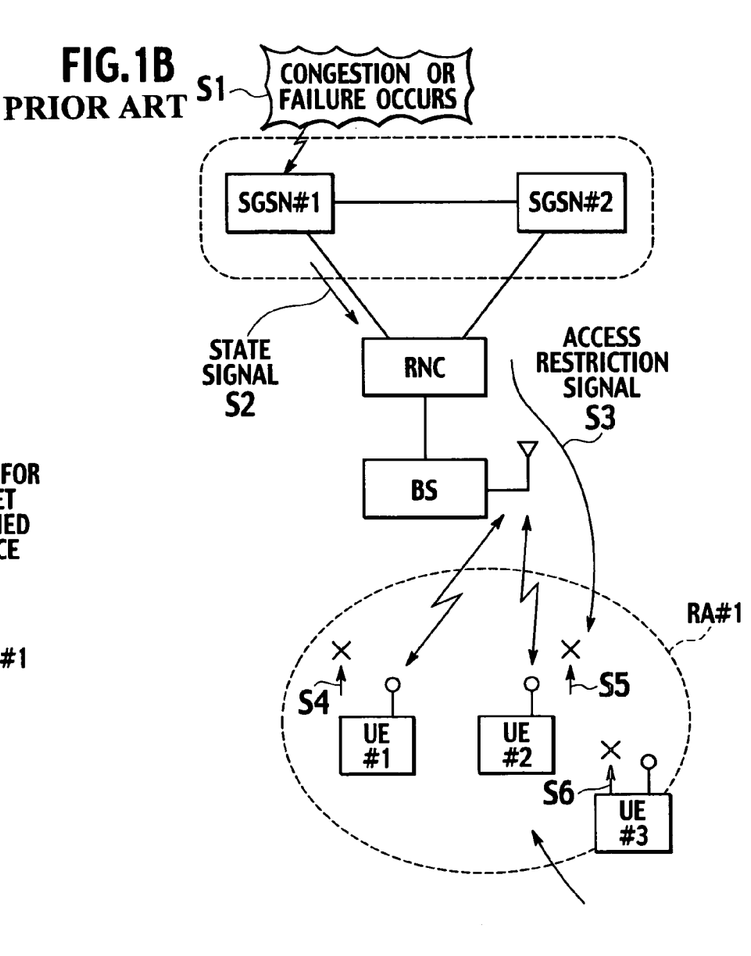

Conventionally, a mobile communication system in which one location registration area is managed by a plurality of exchanges so that processing load in each exchange can be dispersed is known. Referring to FIGS. 1A and 1B, this type of mobile communication system will be explained.

In this mobile communication system, as shown in FIG. 1A, a radio network controller RNC is connected to a first exchange for a packet switched service SGSN (Serving GPRS Support Node) #1 and a second exchange for a packet switched service SGSN #2, which manage a same routing area (location registration area) RA #1, via predetermined interfaces (e.g. Iu-flex interfaces).

When receiving a location registration request from a mobile station UE in the routing area RA #1, the radio network controller RNC is configured to determine an SGSN to which the mobile station UE performs the location registration, in accordance with the load status in each SGSN.

The radio network controller RNC is configured to transfer the location registration request from the mobile station UE to the determined SGSN.

In FIG. 1A, a mobile station UE #1 performs the location registration to the first SGSN #1 in the routing area RA #1, and transmits signals for each type of packet switched service via the first SGSN #1.

On the other hand, a mobile station UE #2, which is located in the same routing area RA #1, performs the location registration to the second SGSN #2, and transmits signals for each type of packet switched service via the second SGSN #2.

However, in the conventional mobile communication system, there has been a problem in that, in the case where congestion or failure occurs in one of a plurality of SGSNs managing a same routing area RA #1, not only mobile stations UE registered in the SGSN but also mobile stations UE registered in other SGSNs fail to transmit signals for each type of packet switched service to the registered SGSN, that is, those mobile stations UE cannot use packet switched service in that situation.

Specifically, as shown in FIG. 1B, when congestion or failure occurs in the first SGSN #1, in step S1, the first SGSN #1 transmits a state signal to the radio network controller RNC, so as to notify the occurrence of the congestion or the failure, in step S2.

In step S3, the radio network controller RNC broadcasts an access restriction signal, which restricts accesses to the packet switched service domain, to mobile stations UE in the routing area RA #1.

Here, in the conventional mobile communication system, the radio network controller RNC cannot identify the first SGSN #1 where the congestion or the failure occurs, in the access restriction signal.

Therefore, in step S4, the mobile station UE #1 stops transmitting signals for each type of packet switched service addressed to the first SGSN #1, in accordance with the received access restriction signal.

And, in step S5, the mobile station UE #2 also stops transmitting the signal for each type of packet switched service addressed to the second SGSN #2, in accordance with the received access restriction signal.

Further, in step S6, a mobile station UE #3, which has newly moved into the routing area RA #1 from another routing area, cannot transmit a location registration request in routing area PA #1 even though the second SGSN #2 is available.

BRIEF SUMMARY OF THE INVENTION

The present invention has been made in view of the above problems, and has an object of providing a mobile communication method in which a mobile station which has performed the location registration to a second SGSN managing a same location registration area as a first SGSN and a mobile station which has newly moved into the location registration area can access to the second SGSN which is originally available, when congestion or failure occurs in the first SGSN, and a mobile station and a radio network controller which can used in the mobile communication method.

A first aspect of the present invention is summarized as a mobile station for performing location registration to one of exchanges managing a location registration area where the mobile station is located, in a mobile communication system in which a plurality of exchanges manage one location registration area and a radio network controller is connected to the plurality of exchanges. The mobile station includes a communication controller configured to stop transmission of signals to the radio network controller, when an identifier of an exchange notified by an access restriction signal from the radio network controller matches an identifier of an exchange which has performd the location registration of the mobile station.

In the first aspect, the mobile station can further include a mobile station identifier storage configured to store an identifier of the mobile station allocated in a location registration area where the location registration is performed; and the communication controller can be configured to stop transmission of signals to the radio network controller, when an identifier of an exchange notified by the access restriction signal from the radio network controller matches the identifier of an exchange included in the identifier of the mobile station.

In the first aspect, the mobile station can further include a location area identifier storage configured to store an identifier of location registration area where the location registration is performed; and the communication controller can be configured to stop transmission of signals to the radio network controller, when an identifier of an exchange notified by the access restriction signal from the radio network controller matches an identifier of an exchange included in the identifier of the mobile station, and when an identifier of a location registration area notified from the radio network controller matches the identifier of a location registration area stored in the location area identifier storage.

In the first aspect, the mobile station can further include an exchange identifier storage to receive and store an identifier of an exchange which has performed the location registration of the mobile station, from the radio network controller, and the communication controller can be configured to stop transmission of signals to the radio network controller, when an identifier of an exchange notified by the access restriction signal from the radio network controller matches the identifier of an exchange stored in the exchange identifier storage.

In the first aspect, the identifier of the exchange can be configured to uniquely identify each exchanges in a specific location registration area and adjacent location registration areas.

In the first aspect, the communication controller can be configured to restart transmission of signals to the radio network controller, when an identifier of an exchange notified by an access restriction release signal from the radio network controller matches an identifier of an exchange which has performed the location registration of the mobile station.

A second aspect of the present invention is summarized as a radio network controller which is connected to a plurality of exchanges, in a mobile communication system in which the plurality of exchanges manage one location registration area. The radio network controller includes a monitor configured to monitor a state of the plurality of exchanges; an exchange identifier notifier configured to notify an identifier of a specific exchange to a mobile station under control of the radio network controller, when the monitor detects an inaccessibility to the specific exchange; and a location area identifier notifier configured to notify an identifier of the location registration area to a mobile station under control of the radio network controller.

A third aspect of the present invention is summarized as a mobile communication method in which a mobile station performs a location registration to one of exchanges which manage a location registration area where the mobile station is located, in a mobile communication system where a plurality of exchanges manage one location registration area and a radio network controller is connected to the plurality of exchanges. The mobile communication method includes: storing, at the mobile station, an identifier of the mobile station which is allocated in a location registration area where the mobile station has performed the location registration; detecting, at the radio network controller, an inaccessibility to a specific exchange among the plurality of exchanges; notifying, at the radio network controller, an identifier of the specified exchange to a mobile station under control of the radio network controller; notifying, at the radio network controller, an identifier of the location area to a mobile station under control of the radio network controller; and stopping, at the mobile station, transmission of signals to the radio network controller, when an identifier of an exchange notified by an access restriction signal from the radio network controller matches an identifier of an exchange stored in the identifier of the mobile station.

DETAILED DESCRIPTION OF THE INVENTION

<Mobile Communication System According to First Embodiment of the Present Invention>

Figure 2:
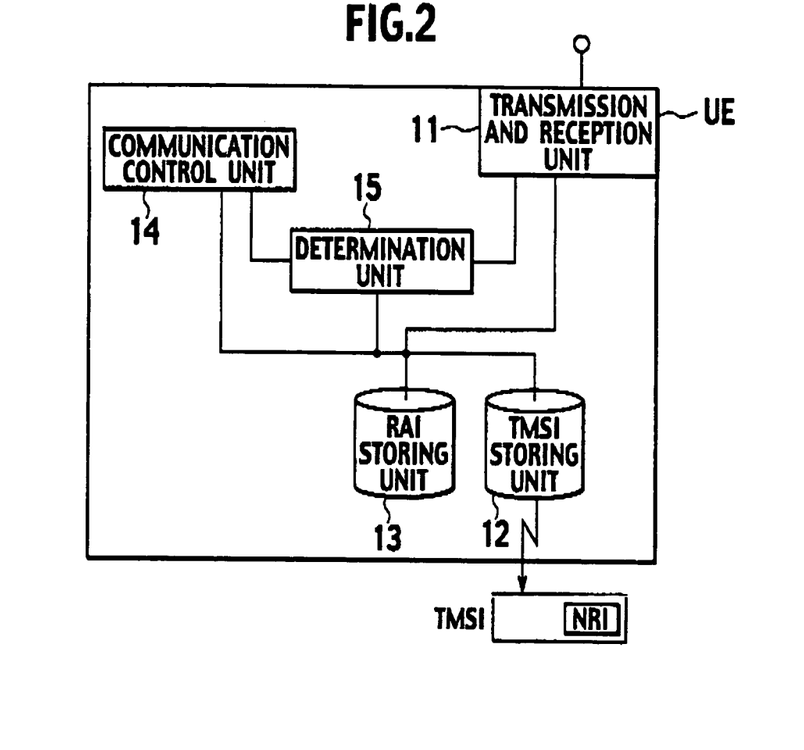
FIG. 2 is a functional block diagram of a mobile station according to first to third embodiments of the present invention.
Figure 3:
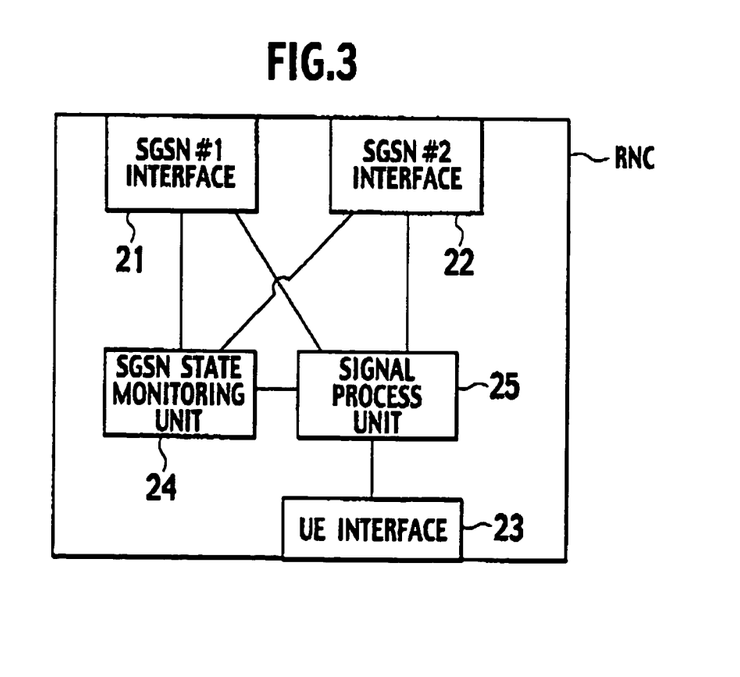
FIG. 3 is a functional block diagram of a radio network controller according to the first to third embodiments of the present invention.

Referring to FIGS. 2 and 3, a mobile communication system according to the first embodiment of the present invention will be described. The entire configuration of the mobile communication system according to the present invention is mostly the same as the entire configuration of the conventional mobile communication system shown in FIGS. 1A and 1B. A configuration of the mobile communication system according to the present embodiment will be explained, focusing on the difference from the configuration of the conventional mobile communication system.

According to the mobile communication system of the present embodiment, a first SGSN #1 and a second SGSN #2 manage a same routing area (location registration area) RA #1, and a radio network controller RNC is connected to the SGSN #1 and the SGSN #2 respectively.

A mobile station UE according to the present embodiment is configured to perform the location registration to one of SGSNs which manage a routing area RA where the mobile station UE is located.

As shown in FIG. 2, the mobile station UE includes a transmission and reception unit 11, a TMSI storage unit 12, an RAI storage unit 13, a communication control unit 14 and a determination unit 15.

The transmission and reception unit 11 is configured to set a radio channel with a base station BS, to transmit signals for a packet of switched service to the radio network controller RNC via the radio channel, and to receive signals such as an access restriction signal from the radio network controller RNC. The signals for a packet switched service includes a location registration request.

The TMSI storage unit 12 is configured to store a "mobile station identifier" allocated in the routing area where the mobile station UE has performed the location registration.

Specifically, the TMSI storage unit 12 is configured to store a "temporary user identifier (TMSI: Temporary Mobile Subscriber Identity)" allocated during the location registration.

Here, the TMSI includes an "NRI (Node Resource Indicator)" which is an identifier of an SGSN to which the mobile station UE has performed the location registration. However, the mobile station UE does not know whether or not an NRI is included in TMSI, and cannot detect the NRI from the TMSI by itself.

The RAI storage unit 13 is configured to store an identifier of the routing area where the mobile station UE has performed location registration.

Specifically, the RAI storage unit 13 is configured to detect an "RAI (Routing Area Indicator)" from a notification signal periodically transmitted from the radio network controller RNC, and to store the detected RAI.

The communication control unit 14 is configured to perform necessary controls on communications for a packet switched service.

For example, the communication control unit 14 is configured to determine to perform the location registration to an SGSN, in such case where the power is turned on or turned off, or the location registration area is changed.

The communication control unit 14 is configured to transmit a signal for a packet switched service, which is generated in accordance with an instruction from a user, to the radio network controller RNC.

The determination unit 15 is configured to determine whether or not to transmit a signal for a packet switched service to the radio network controller RNC, in accordance with an access restriction signal or an access restriction release signal broadcasted from the radio network controller RNC.

Specifically, the determination unit 15 is configured to determine to stop transmitting signals for a packet switched service to the radio network controller RNC, in the case where an NRI of an SGSN notified by an access restriction signal from the radio network controller RNC matches an NRI of an SGSN included in the TMSI, and where an RAI notified by the notification signal from the radio network controller RNC matches an RAI stored in the RAI storage unit 13.

The determination unit 15 is configured to restart transmission of signals for a packet switched service to the radio network controller RNC, in the case where the NRI of the SGSN notified by an access restriction release signal from the radio network controller RNC matches the NRI of the SGSN included in the TMSI, and where the RAI notified by the notification signal from the radio network controller RNC matches the RAI stored in the RA T storage unit 13.

The radio network controller RNC according to the present embodiment, a shown in FIG. 3, includes an SGSN #1 interface 21, an SGSN #2 interface 22, a UE interface 23, an SGSN state monitoring unit 24 and a signal process unit 25, The SGSN #1 interface 21 is an interface used for communications with the first SGSN #1, and the SGSN #2 interface 22 is an interface used for communications with the second SGSN #2.

The UE interface 23 is an interface used for communications between mobile stations UE #1 and #2 in a routing area RA which is managed by the SGSNs connected with the radio network controller RNC. Here, the SGSN 41 interface 21 and the SGSN #2 interface 22 constitute an Iu-flex interface.

The SGSN state monitoring unit 24 is configured to monitor a state of the first SGSN #1 and the second SGSN #2.

For example, the SGSN state monitoring unit 24 is configured to detect an inaccessibility to each SGSNs in accordance with a state signal transmitted from each SGSN. For example, the SGSN state monitoring unit 24 is configured to detect that the failure occurs in each SGSNs or that the load of each SGSNs crosses a predetermined threshold, in the state signal.

The SGSN state monitoring unit 24 is configured to also detect the accessibility to each SGSN, in accordance with the state signals transmitted from each SGSN. For example, the SGSN state monitoring unit 24 is configured to also detect that the failure is recovered in each SGSNs or the load of each SGSNs becomes smaller than the predetermined threshold, in accordance with the state signals.

Further, the SGSN state monitoring unit 24 may be configured to monitor the load in each SGSN, in accordance with the state signals transmitted from each SGSN.

The signal process unit 25 is configured to perform a predetermined process on the signals transmitted or received via the interfaces 21 to 23.

Specifically, when receiving a location registration request from a mobile station UE under the control of the radio network controller RNC, the signal process unit 25 is configured to determine an SGSN for the location registration of the mobile station UE, based on the state of loads in the first SGSN #1 and the second SGSN #2. The signal process unit 25 transfers the location registration request to the determined SGSN.

Here, the location registration request includes a location registration update signal for a packet switched service (Normal Routing Area Update), an attach signal for a packet switched service (GPRS attach) or the like.

The signal process unit 25 is configured to transfer signals for each type of packet switched service from the mobile station UE under the control of the radio network controller RNC to the SGSN for location registration of the mobile station UE.

The signals for each type of packet switched service may be any signal to be transmitted for using a packet switched service.

The signal process unit 25 is configured to broadcast, via the UE interface 23, an access restriction signal for a relevant SGSN to the mobile station UE under the control of the radio network controller RNC, when detecting an inaccessibility to the SGSN.

The signal process unit 25 may include the location or bit number or the like of the NRI in the TMSI to the access restriction signal, 80 as to inform the mobile station UE of an SGSN which is inaccessible.

The signal process unit 25 may add an NRI to an access restriction signal explicitly, so as to inform the mobile station UE of an SGSN which is inaccessible.

Similarly, the signal process unit 25 is configured to broadcast an access restriction release signal for relevant SGSN to the mobile station UE under the control of the radio network controller RNC via the UE interface 23, when detecting an accessibility to each SGSN.

The signal process unit 25 is configured to periodically inform the mobile station UE of an identifier of the routing area managed by the SGSN connected with the radio network controller RNC, with using notification signals.

Figure 4:
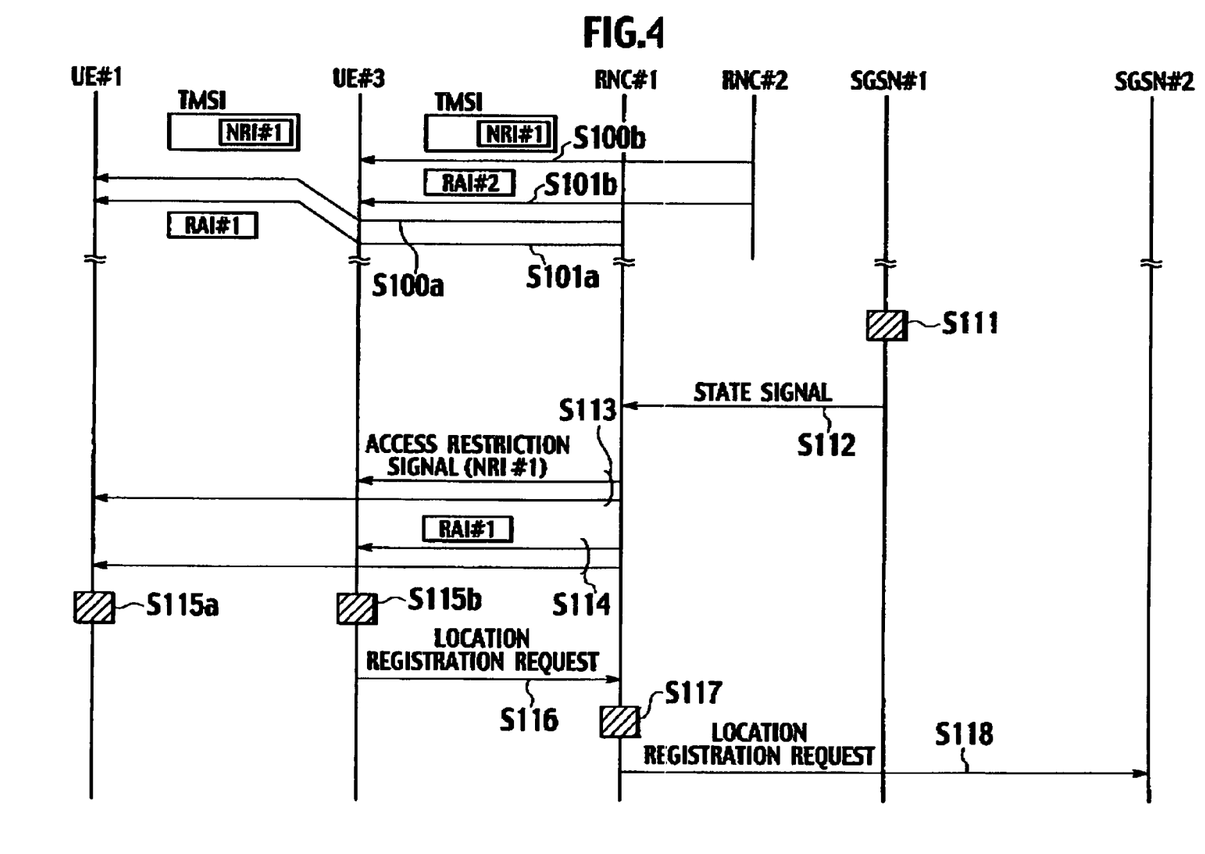
FIG. 4 is a sequence diagram showing an operation of a mobile communication system according to the first embodiment of the present invention.

Referring to the FIGS. 4 and 5, an operation of the mobile communication system according to the present embodiment will be explained.

In step S100*a*, a mobile station UE #1 in a routing area RA #1 performs the location registration to a first SGSN #1 managing the routing area RA #1, obtains an TMSI including an NRI #1 of the first SGSN #1 from a first radio network controller RNC #1, and stores the obtained TMSI in the TMSI storage unit 12.

In step S101*a*, the mobile station UE #1 obtains an RAI #1 from the first radio network controller RNC #1 and stores the obtained RAI #1 in the RAI storage unit 13.

Similarly, in step S100*b*, a mobile station UE #3 in a routing area RA #2 per forms the location registration to a third SGSN #3 managing the routing area RA #2, obtains an TMSI including an NRI #1 of the third SGSN #3 from a second radio network controller RNC #2, and stores the TMSI in the TMSI storage unit 12.

In step S101b, the mobile station UE #1 obtains an RAI #2 from the second radio network controller RNC #2 and stores the RAI #2 in the RAI storage unit 13.

As described above, the same NRI #1 is allocated as the identifier of the first SGSN #1 and the identifier of the second SGSN #3.

In step S111, failure or congestion occurs in the first SGSN #1. In step S112, the first SGSN #1 transmits a state signal to the first radio network controller RNC #1 so as to notify the failure of congestion.

In step S113, the first radio network controller RNC #1 detects the occurrence of the failure or the congestion in the first SGSN #1 in accordance with the state signal, and broadcasts an access restriction signal including the NRI #1 of the first SGSN #1 to the mobile station UE #1 in the routing area RA #1.

In step S114, the first radio network controller RNC #1 transmits a notification signal for notifying the RAI #1, to mobile stations located in the routing area RA #1.

In step S115a, the mobile station UE #1 determines that the NRI #1 of the first SGSN #1 included in the access restriction signal broadcasted from the first radio network controller RNC #1 matches the NRI #1 of the SGSN included in the TMSI stored in the TMSI storage unit 12, and that the RAI #1 notified by the notification signal from the first radio network controller RNC #1 matches the RAI #1 stored in the RAI storage unit 13, The mobile station U S #1 stops transmitting signals for a packet switched service to the first radio network controller RNC #1 in accordance with the determination results.

On the other hand, in step S115b, the mobile station UE #3 which has newly moved into the routing area RA #1 determines that the NRI #1 of the first SGSN #1 included in the access restriction signal broadcasted from the first radio network controller RNC #1 matches the NRI 41 of the SGSN included in the TMSI stored in the TMST storage unit 12, and that the RAI #1 notified by the notification signal from the first radio network controller RNC #1 does not match the RAT #2 stored in the RAI storage unit 13.

In step S116, the mobile station UE #3 transmits a location registration request in the routing area RA #1 to the first radio network controller RNC #1 in accordance with the determined result.

In steps S117 and 118, the location registration request from the mobile station UE #3 is transferred, via the first radio network controller RNC #1, to the second SGSN #2 managing the routing area RA #1, and location registration of the mobile station UE #3 is performed in the second SGSN #2.

In the mobile communication system according to the present embodiment, when congestion or failure occurs in the first SGSN #1, the mobile station UE #2 which has performed the location registration to the second SGSN #2 and the mobile station UE #3 which has newly moved into the routing area RA #1 can access to the second SGSN #2 which is originally available. Here, the location of the mobile station UE 42 is registered in the second SGSN #2 which manages the same routing area RA #1 as the first SGSN #1.

<Mobile Communication System According to Second Embodiment of the Present Invention>

Figure 5:
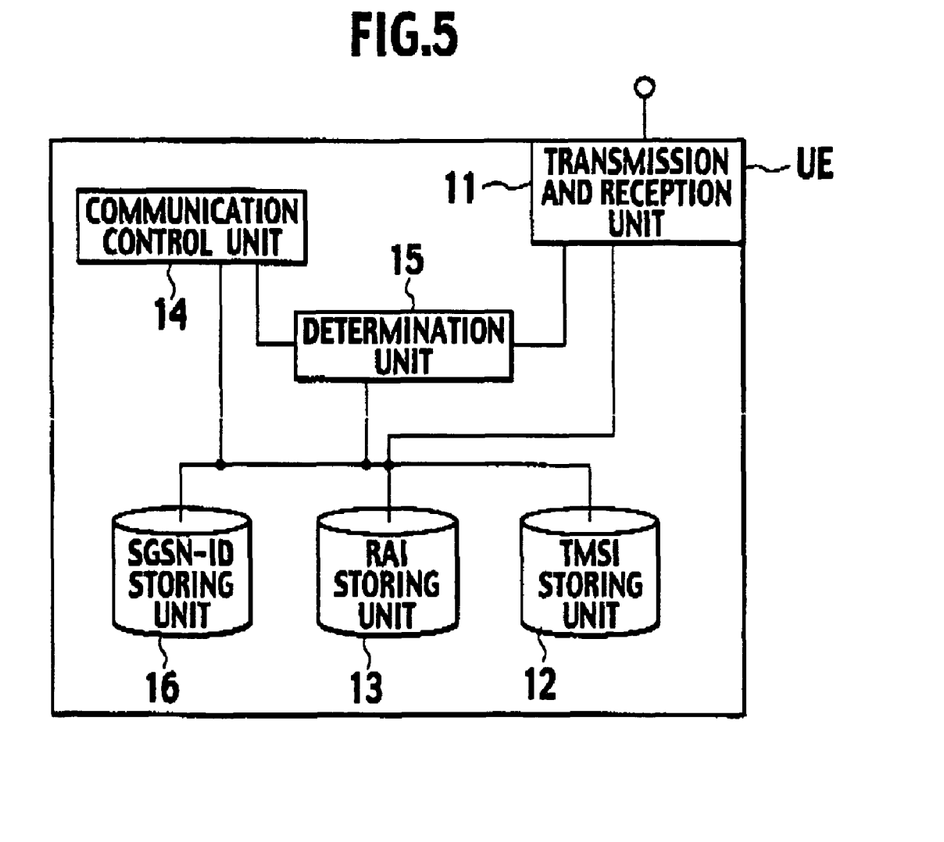
FIG. 5 is a functional block diagram of a mobile station according to the second embodiment of the present invention.

Referring to FIG. 5, a configuration of a mobile communication system according to the second embodiment of the present invention will be described, The configuration of the mobile communication system according to the present embodiment will be described, focusing on the difference from the configuration of the mobile communication system according to the first embodiment.

As shown in FIG. 5, the mobile station UE according to the second embodiment includes an SGSN-ID storing unit 16, in addition to the elements of the mobile station UE of the first embodiment.

The SGSN-ID storing unit 16 is configured to store an "SGSN-ID" of an SGSN to which the mobile station UE has performed location registration.

Specifically, the SGSN-ID storing unit 16 is configured to receive and store the SGSN-ID transmitted from the radio network controller RNC in a predetermined timing.

The radio network controller RNC may be configured to transmit an SGSN-ID during the process of location registration of the mobile station UE, or to transmit the SGSN-ID after the procedure of location registration of the mobile station UE.

The SGSN-ID is configured to uniquely identify each SGSNs in all routing areas RAs in the mobile communication system. The SGSN-ID typically includes less information than the TMSI in their data amount.

The determination unit 15 is configured to stop transmitting signals for a packet switched service to the radio network controller RNC, when the SGSN-ID notified by the access restriction signal from the radio network controller RNC matches the SGSN-ID stored in the SGSN-ID storing unit 16.

The determination unit 15 is configured to restart transmitting signals for a packet switched service to the radio network controller RNC, when the SGSN-ID notified by the access restriction release signal from the radio network controller RNC matches the SGSN-ID stored in the SGSN-ID storing unit 16.

Figure 6:
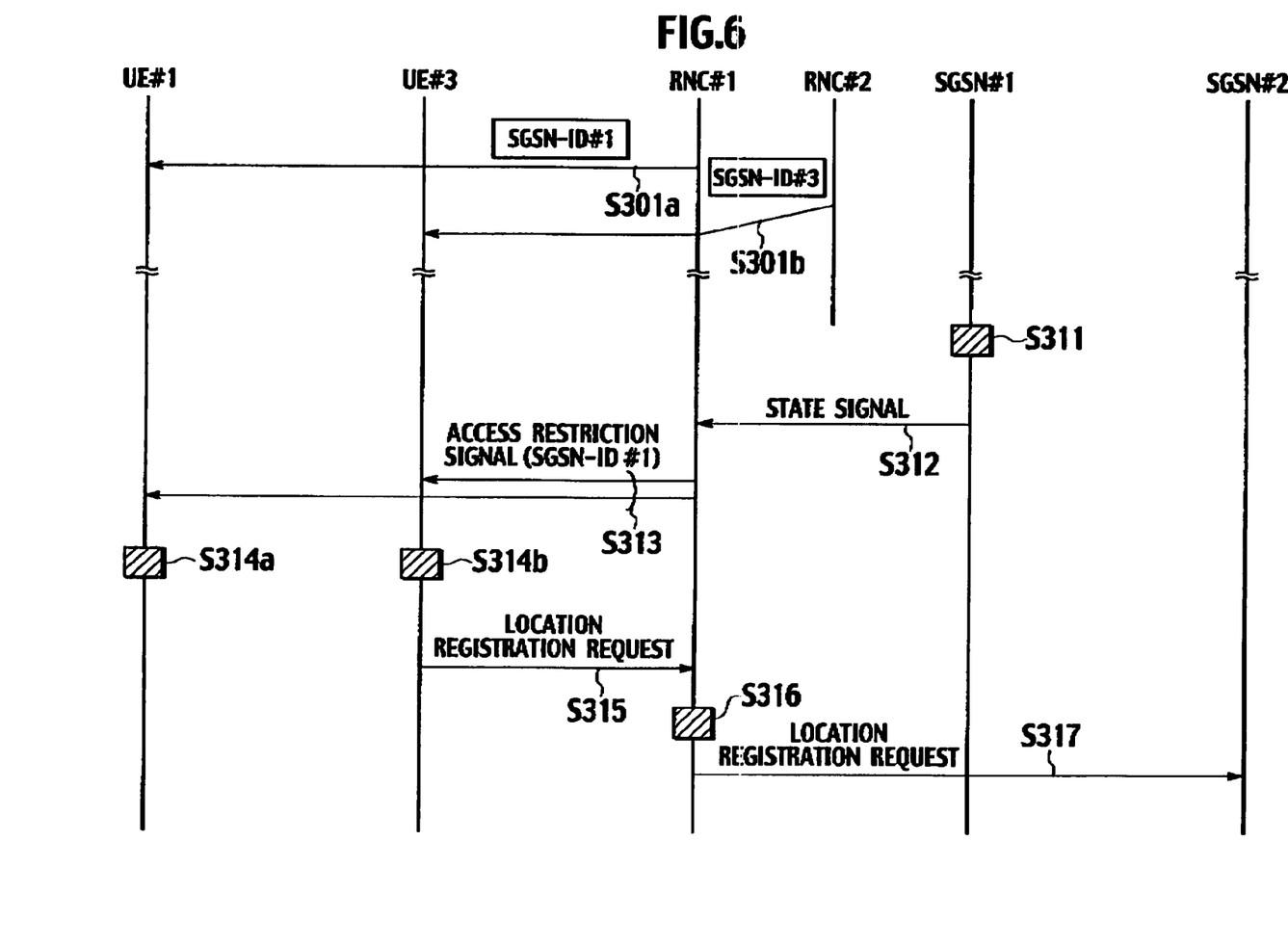
FIG. 6 is a sequence diagram showing an operation of a mobile communication system according to the second embodiment of the present invention.

Referring to FIG. 6, an operation of the mobile communication system according to the present embodiment will be described.

In step S301, a mobile station UE #1 in a routing area RA #1 performs the location registration to a first SGSN #1 which manages the routing area RA #1.

A first radio network controller RNC #1 transmits, in a predetermined timing, an SGSN-ID #1 of the first SGSN #1 to which the location registration of the mobile station UE #1 has performed, to the mobile station UE #1. The mobile station UE #1 stores the received SGSN-ID #1 in the SGSN-ID storing unit 16.

Similarly, in step S301b, a mobile station UE #3 in a routing area RA #2 performs the location registration to a third SGSN #3 which manages the routing area RA #2.

A second radio network controller RNC #2 transmits, in a predetermined timing, an SGSN-ID #3 of the third SGSN #3 to which the location registration of the mobile station UE #3 has performed, to the mobile station UE #3. The mobile station UE #3 stores the received SGSN-ID #3 in the SGSN-ID storing unit 16.

In step S311, congestion or failure occurs in the first SGSN #1. In step S312, the first SGSN #1 transmits a state signal to the first radio network controller RNC #1 for notifying the occurrence of the congestion or the failure.

In step S313, the first radio network controller RNC #1 detects the congestion or the failure in the first SGSN #1 in accordance with the state signal, and broadcasts an access restriction signal including an SGSN-ID #1 to mobile stations UB in the routing area RA #1.

In step S314a, the mobile station UE #1 determines that the SGSN-ID #1 included in the access restriction signal broadcasted from the first radio network controller RNC #1 matches the SGSN-ID #1 stored in the SGSN-ID storing unit 16.

Here, the mobile station UE #1 stops transmitting signals for a packet switched. service to the first radio network controller RNC #1 in accordance with the determination result.

On the other hand, in step S314b, the mobile station UE #3 which has newly moved into the routing area RA #1 determines that the SGSN-ID #1 included in the access restriction signal broadcasted from the first radio network controller RNC #1 does not match the SGSN-ID #3 stored in the SGSN-ID storing unit 16.

In step S315, the mobile station UE #3 transmits a location registration request for the routing area RA #1 to the first radio network controller RNC #1 in accordance with the determined result.

In steps S316 and S317, the location registration request from the mobile station UE #3 is transferred, via the first radio network controller RNC #1, to the second SGSN #2 which manages the routing area RA #1, and the location registration of the mobile station UE #3 is performed in the second SGSN #2.

In the mobile communication system according to the present embodiment, the SGSN-ID can uniquely identify each SGSNs in all routing areas. Therefore, the mobile station UE can control transmission of signals for a packet switched service to the radio network controller RNC by comparing the SGSN-Ids, so that the processing load in the mobile station UE can be reduced.

<Mobile Communication System According to Third Embodiment of the Present Invention>

Figure 7A:
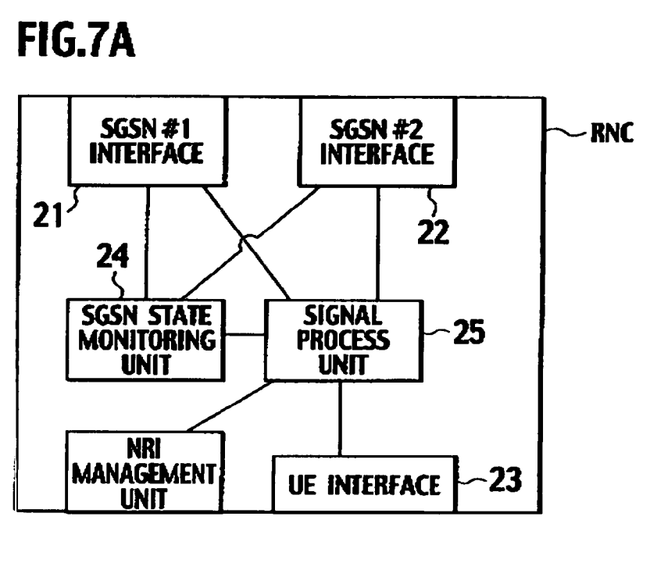
FIGS. 7A and 7B are a functional block diagram of a radio network controller and a view of location registration areas according to the third embodiment of the present invention.
Figure 7B:
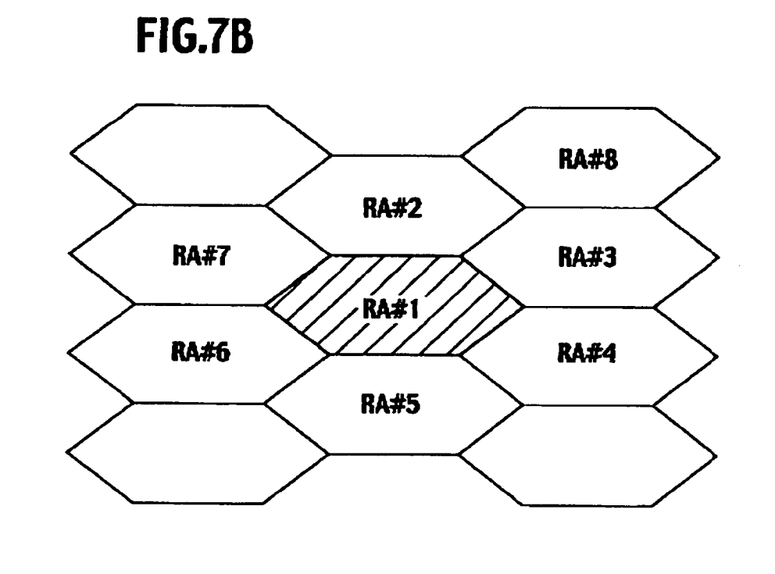

Referring to FIGS. 7A and 7B, a configuration of the mobile communication system according to the third embodiment of the present invention will be described. The configuration of the mobile communication system according to the third embodiment will be described, focusing on the difference from the configuration of the first embodiment.

As shown in FIG. 7A, a radio network controller RNC according to the present embodiment includes an NRI management unit, in addition to the elements of the radio network controller RNC according to the first embodiment.

The NRI management unit 26 is configured to manage so that an NRI of an SGSN, in cooperation with other radio network controllers RNC, can uniquely identify each SGSNs in the routing area RA managed by the radio network controller RNC and in the routing areas RAs which are adjacent to the routing area RA.

Specifically, as shown in FIG. 7B, the radio network controller RNC managing the routing area RA #1 is configured to manage so that the NRI of the SGSN can uniquely identify each SGSN, in cooperation with the radio network controllers RNC managing the routing areas RAs #2 to #7.

However, in the routing areas RAs #1 and #8, the same NRI of SGSN can be allocated to different SGSNs.

As described above, a plurality of radio network controllers RNC may work together so as to allocate the NRI of the SGSN, or another independent NRI management device (not shown) may allocate all NRI of the SGSNs.

In the latter case, the NRI management unit 26 is configured to receive an NRI of an SGSN allocated by the NRI management device.

In the present embodiment, in the routing area RA managed by the radio network controller RNC and in another routing area RA adjacent to the routing area RA, NRIs of each SGSNs are allocated so that each SGSNs can be identified uniquely.

However, the routing area RA to which NRIs of each SGSNs are allocated can be set as other areas, so that the SGSN can be identified uniquely.

Figure 8:
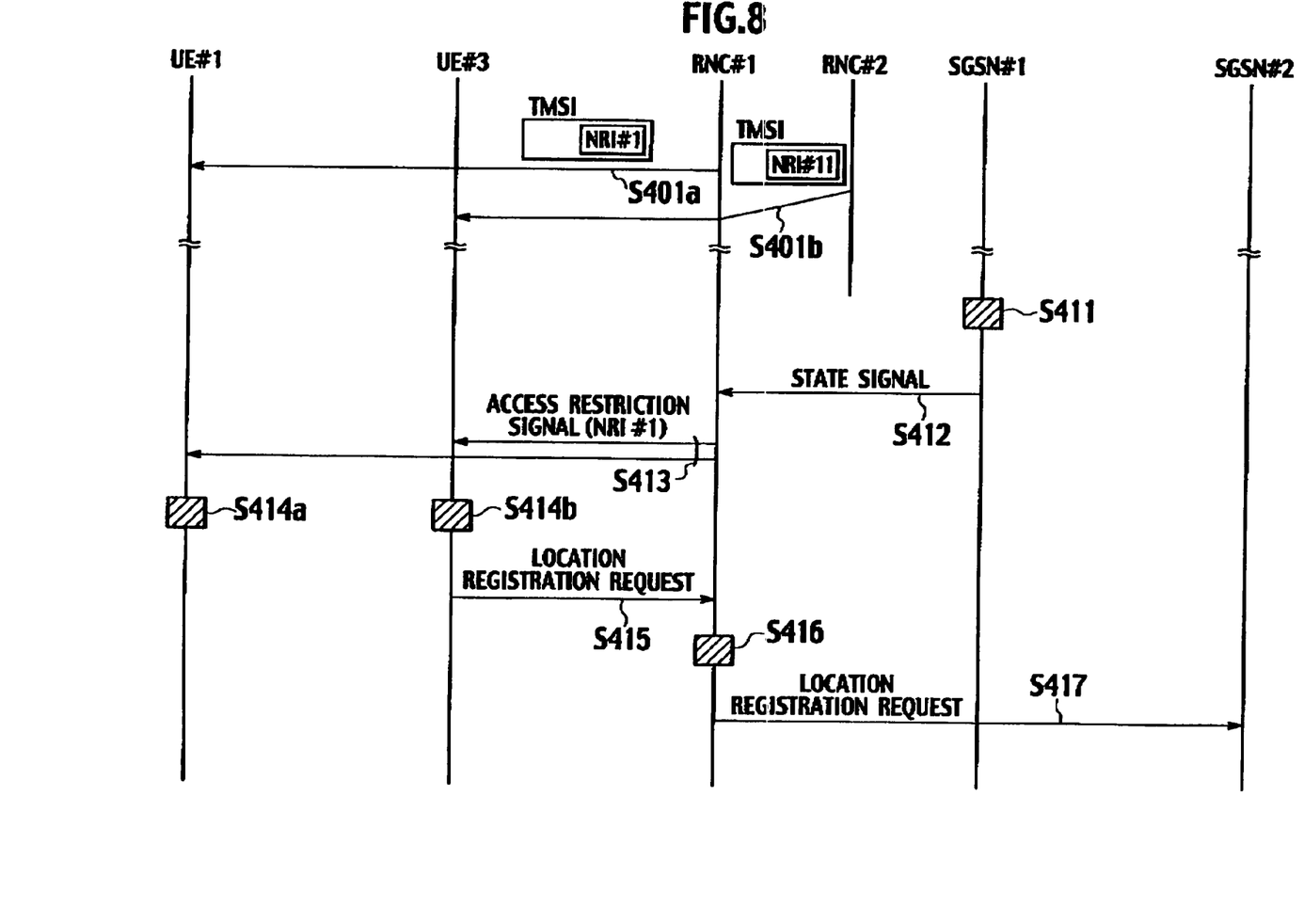
FIG. 8 is a sequence diagram showing an operation of a mobile communication system according to the third embodiment of the present invention.

Referring to the FIG. 8, an operation of the mobile communication system according to the present embodiment will be described.

In step S401a, a mobile station UE #1 in a routing area RA #1 performs the location registration to a first SGSN #1 which manages the routing area RA #1.

The mobile station UE #1 obtains a TMSI including an NRI #1 of a first SGSB #1 from a first radio network controller RNC #1, and stores the obtained TMSI in the TMSI storage unit 12.

Similarly, in step S401b, the mobile station UE #3 in the routing area RA #2 performs the location registration to a third SGSN #3 managing a routing area RA #2.

The mobile station UE #3 obtains a TMSI including an NRI #11 of the third SGSN #3 from a second radio network controller RNC #2, and stores the obtained TMSI in the TMSI storage unit 12.

Here, since the routing areas RAs #1 and RA #2 are adjacent to each other, distinct identifiers are allocated as the NRI #1 of the first SGSN #1 which manages the routing area RA #1, and as the NRI #11 of the third SGSN #3 which manages the routing area RA #2.

In step S411, congestion or failure occurs in the first SGSN #1. In step S412, the first SGSN #1 transmits a state signal to the first radio network controller RNC #1 for notifying the occurrence of the congestion or the failure.

In step S413, the radio network controller RNC #1 detects the congestion or the failure in the first SGSN #1 in accordance with the state signal, and broadcasts an access restriction signal including the NRI #1 of the first SGSN #1 to the mobile stations in the routing area RA #1.

In step S414a, the mobile station UE #1 detects that the NRI #1 of the first SGSN #1 included in the access restriction signal broadcasted from the first radio network controller RNC #1 matches the NRI #1 of the SGSN included in the TMSI stored in the TMSI storing unit 12.

Here, the mobile station UE #1 stops transmitting signals for a packet switched service to the first radio network controller RNC #1 in accordance with the determined result.

On the other hand, in step S414b, the mobile station UE #3 which has newly moved into the routing area RA #1 determines that the NRI #1 of the first SGSN #1 included in the access restriction signal broadcasted from the first radio network controller RNC #1 does not match the NRI #11 of the SGSN included in the TMSI stored in the TMSI storing unit 12.

In step S415, the mobile station UE #3 transmits a location registration request for the routing area RA #1 to the first radio network controller RNC #1 in accordance with the determined result.

In steps S416 and S417, the location registration request from the mobile station UE #3 is transferred, via the first radio network controller RNC #1, to the second SGSN #2 managing the routing area RA #1, and the location registration of the mobile station UE #3 is performed in the second SGSN #2.

According to the mobile communication system of the present embodiment, NRIs of each SGSNs can identify each SGSNs uniquely, in a predetermined range of routing area. Therefore, the mobile station UE can control the transmission of signals for a packet switched service to the radio network controller RNC by comparing the NRIs of each SGSNs, and the processing load in the mobile station UE can be reduced.

<Modification>

In the present embodiment, examples in that SGSNs are used as exchangers has been explained. However it should be noted that the present invention is not limited to this, and an MSC/VLR (Mobile service Switching Center/Visitor Location Register) can be also applied in the same way. Here, the "MSC/VLR" indicates an exchange for a circuit switched service.

Further, in the present embodiment, routing areas RAs are described as location registration areas. However, it should be noted that the present invention is not limited to this, and a location registration area or the like can be also applied as a location area.

As described above, the present invention can provide a mobile communication method in which a mobile station which has performed the location registration to a second SGSN managing a same location registration area as a first SGSN and a mobile station which has newly moved into the location registration area can access to the second SGSN which is originally available, when congestion or failure occurs in the first SGSN, and a mobile station and the radio network controller which can used in the mobile communication method.

Additional advantages and modifications will readily occur to those skilled in the art. Therefore, the invention in its broader aspects is not limited to the specific details and the representative embodiment shown and described herein. Accordingly, various modifications may be made without departing from the scope of the general inventive concept as defined by the appended claims and their equivalents.

What is claimed is:

1. A mobile station for performing location registration to one of plural exchanges managing a location registration area where the mobile station is located, in a mobile communication system in which a radio network controller is connected to the plural exchanges, the mobile station comprising:
a determiner configured to determine whether an identifier of an exchange notified by an access restriction signal from the radio network controller matches an identifier of the one of the plural exchanges which has performed the location registration of the mobile station, the access restriction signal is broadcast from the radio network controller when a failure or congestion occurs in one of the plural exchanges, and the access restriction signal includes the identifier to identify the exchange in which the failure or congestion occurred; and
a communication controller configured to stop transmission of signals to the exchange which has performed the location registration of the mobile station when the identifier of the exchange notified by the access restriction signal from the radio network controller matches the identifier of the exchange which has performed the location registration of the mobile station and enable transmission of signals to the exchange which has performed the location registration of the mobile station when the identifier of the exchange notified by the access restriction signal from the radio network controller is different than the identifier of the exchange that has performed the location registration of the mobile station,
wherein the access restriction signal includes a location or a bit number of the identifier of the specific exchange in which the failure or congestion occurred;
the identifier of the one of the plural exchanges that has performed the location registration of the mobile station is included in a temporary identifier of the mobile station; and
the communication controller determines if the exchange in which the failure or congestion occurred is the exchange of the one of the plural exchanges that has performed the location registration of the mobile station based on the location or the bit number included in the access restriction signal.

2. The mobile station according to claim 1, further comprising:
a mobile station identifier storage configured to store an identifier of the mobile station allocated in a location registration area where the location registration is performed; and
wherein the communication controller is configured to stop transmission of signals to the radio network controller, when the identifier of the exchange notified by the access restriction signal from the radio network controller matches the identifier of an exchange included in the identifier of the mobile station.

3. The mobile station according to claim 1, further comprising:
a location area identifier storage configured to store an identifier of location registration area where the location registration is performed; and
wherein the communication controller is configured to stop transmission of signals to the radio network controller, when the identifier of the exchange notified by the access restriction signal from the radio network controller matches an identifier of an exchange included in an identifier of the mobile station, and when an identifier of a location registration area notified from the radio network controller matches the identifier of a location registration area stored in a location area identifier storage.

4. The mobile station according to claim 1, further comprising:
an exchange identifier storage to receive and store an identifier of an exchange which has performed the location registration of the mobile station, from the radio network controller, and
wherein the communication controller is configured to stop transmission of signals to the radio network controller, when the identifier of the exchange notified by the access restriction signal from the radio network controller matches the identifier of the exchange stored in the exchange identifier storage.

5. The mobile station according to claim 1, wherein the identifier of the exchange is configured to uniquely identify each exchange in a specific location registration area and adjacent location registration areas.

6. The mobile station according to claim 1, wherein the communication controller is configured to restart transmission of signals to the radio network controller, when an identifier of an exchange notified by an access restriction release signal from the radio network controller matches the identifier of the exchange which has performed the location registration of the mobile station.

7. A mobile communication method in which a mobile station performs a location registration to one of plural exchanges which manage a location registration area where the mobile station is located, in a mobile communication system where a radio network controller is connected to the plural exchanges, the mobile communication method comprising:
storing, at the mobile station, a temporary identifier of the mobile station which is allocated in a location registration area where the mobile station has performed the location registration, and the temporary identifier includes an identifier of the one of the plural exchanges that has performed the location registration of the mobile station;
detecting, at the radio network controller, an inaccessibility to a specific exchange among the plural exchanges when a failure or congestion occurs at the specific exchange;

notifying the mobile station by an access restriction signal under control of the radio network controller, the access restriction signal including an identifier of the specific exchange in which the failure or congestion occurred;

notifying the mobile station of an identifier of the location registration area under control of the radio network controller;

determining whether the identifier of the specific exchange notified by the access restriction signal from the radio network controller matches the identifier of the exchange that has performed the location registration of the mobile phone and which is stored in the temporary identifier of the mobile station;

stopping, at the mobile station, transmission of signals to the exchange which has performed the location registration of the mobile station when the identifier of the specific exchange notified by the access restriction signal from the radio network controller matches the identifier of the exchange stored in the temporary identifier of the mobile station; and enabling, at the mobile station, transmission of signals to the exchange which has performed the location registration of the mobile station when the identifier of the specific exchange notified by the access restriction signal from the radio network controller is different than the identifier of the exchange stored in the temporary identifier of the mobile station, wherein the access restriction signal includes a location or a bit number of the identifier of the specific exchange in which the failure or congestion occurred, the method further comprising:

determining whether the identifier of the specific exchange in which the failure or congestion occurred is the identifier of the exchange, stored in the temporary identifier, of the one of the plural exchanges that has performed the location registration of the mobile station based on the location or the bit number included in the access restriction signal.

8. A mobile station for performing location registration in a mobile communication system to one of plural exchanges managing a location registration area where the mobile station is located, the mobile communication system including a radio network controller connected to the plural exchanges, the mobile station comprising:

a determiner configured to determine whether an identifier of an exchange received in an access restriction signal from the radio network controller matches an identifier of the one of the plural exchanges that has performed the location registration of the mobile station, the access restriction signal is broadcast from the radio network controller when a failure or congestion occurs in one of the plural exchanges, and the access restriction signal includes an identifier to identify an exchange in which the failure or congestion occurred; and a communication controller configured to enable transmission of signals to the exchange which has performed the location registration of the mobile station when the identifier of the exchange received in the access restriction signal from the radio network controller is different than the identifier of the exchange that has performed the location registration of the mobile station, wherein the access restriction signal includes a location or a bit number of the identifier of the specific exchange in which the failure or congestion occurred;

the identifier of the one of the plural exchanges that has performed the location registration of the mobile station is included in a temporary identifier of the mobile station; and the communication controller determines if the identifier of the exchange in which the failure or congestion occurred is different from the identifier of the exchange of the one of the plural exchanges that has performed the location registration of the mobile station based on the location or the bit number included in the access restriction signal.

9. The mobile station according to claim 8, further comprising:

an exchange identifier storage configured to receive, from the radio network controller, and store the identifier of the exchange that has performed the location registration of the mobile station; and the communication controller is configured to stop transmission of signals to the exchange which has performed the location registration of the mobile station when the identifier of the exchange received in the access restriction signal from the radio network controller matches the identifier of the exchange stored in the exchange identifier storage.

\* \* \* \* \*